(12) United States Patent　　(10) Patent No.:　　US 8,713,470 B2
Allen et al.　　(45) Date of Patent:　　Apr. 29, 2014

(54) AUTOMATED USER INTERFACE ADJUSTMENT

(75) Inventors: Corville Orain Allen, Morrisville, NC (US); Albert Alexander Chung, Cary, NC (US); Binh Truong, Cary, NC (US); Kam Kan Yee, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 1145 days.

(21) Appl. No.: 12/114,000

(22) Filed: May 2, 2008

(65) Prior Publication Data

US 2009/0276726 A1　　Nov. 5, 2009

(51) Int. Cl.
*G06F 3/048*　　(2013.01)

(52) U.S. Cl.
USPC ........... 715/784; 715/785; 715/787; 715/788; 715/790

(58) Field of Classification Search
USPC .......................................... 715/784, 781, 785
See application file for complete search history.

(56) References Cited

U.S. PATENT DOCUMENTS

| | | | | |
|---|---|---|---|---|
| 7,111,240 B2 * | 9/2006 | Crow et al. | | 715/723 |
| 7,274,377 B2 * | 9/2007 | Ivashin et al. | | 345/619 |
| 7,318,196 B2 * | 1/2008 | Crow et al. | | 715/716 |
| 7,434,173 B2 * | 10/2008 | Jarrett et al. | | 715/784 |
| 7,590,946 B2 * | 9/2009 | Okamura | | 715/786 |
| 7,712,044 B2 * | 5/2010 | Lin-Hendel | | 715/785 |
| 2002/0089546 A1 * | 7/2002 | Kanevsky et al. | | 345/800 |
| 2002/0126155 A1 * | 9/2002 | Lin-Hendel | | 345/785 |
| 2005/0177798 A1 * | 8/2005 | Thomson et al. | | 715/788 |
| 2006/0075357 A1 * | 4/2006 | Guido et al. | | 715/784 |
| 2006/0075358 A1 * | 4/2006 | Ahokas | | 715/784 |
| 2007/0097150 A1 * | 5/2007 | Ivashin et al. | | 345/660 |
| 2007/0101289 A1 * | 5/2007 | Awada et al. | | 715/784 |
| 2007/0294635 A1 * | 12/2007 | Craddock et al. | | 715/784 |
| 2008/0109750 A1 * | 5/2008 | Lin-Hendel | | 715/785 |
| 2010/0011316 A1 * | 1/2010 | Sar et al. | | 715/784 |

* cited by examiner

*Primary Examiner* — Daeho Song (74) *Attorney, Agent, or Firm* — Lee Law, PLLC; Christopher B. Lee (57) ABSTRACT

An event associated with a viewable area of an encapsulated component that represents at least a portion of content associated with a user interface component is detected. A determination is made that the event will result in at least a portion of the viewable area of the encapsulated component being outside of a viewable area of the user interface component. The content associated with the user interface component is adjusted automatically to display at least the portion of the viewable area of the encapsulated component within the viewable area of the user interface component.

21 Claims, 10 Drawing Sheets

AUTOMATED USER INTERFACE ADJUSTMENT

BACKGROUND OF THE INVENTION

1. Field of the Invention

The present invention relates to systems and methods for updating a user interface. More particularly, the present invention relates to automated user interface adjustment.

2. Related Art

User interfaces of computing devices take many forms. Text-based user interfaces provide text for presentation to a user of the computing device. Graphical user interfaces (GUIs) provide graphic capabilities for presentation of graphics in addition to text to the user of the computing device.

GUIs include graphical components, such as dialog boxes, text boxes, and drop-down lists. These graphical components include content that may be viewed. Graphical controls, such as selectable buttons, radio buttons, text entry fields, and drop-down list control buttons are used to manually navigate the content of the graphical components.

BRIEF SUMMARY OF THE INVENTION

The subject matter described herein provides automated user interface adjustment of content associated with a user interface container component and an encapsulated component in response to an action or event associated with viewable content of the encapsulated component. The automated adjustments may be performed in response to polled or event-based interactions with the encapsulated component. User manipulations of a control element associated with the encapsulated component are evaluated to determine whether they result in content associated with the encapsulated component extending beyond a viewable area of the container component. Content that extends beyond the viewable area of the container component triggers automated adjustment of the content associated with both the encapsulated component and the container component. Control elements associated with the container component and the encapsulated component are also adjusted to represent adjustment of the content associated with both the container component and the encapsulated component.

A method includes detecting an event associated with a viewable area of an encapsulated component that represents at least a portion of content associated with a user interface component, determining that the event will result in at least a portion of the viewable area of the encapsulated component being outside of a viewable area of the user interface component, and adjusting the content associated with the user interface component automatically to display the at least the portion of the viewable area of the encapsulated component within the viewable area of the user interface component.

A system includes a user interface component adapted to associate an encapsulated component as at least a portion of content associated with the user interface component, and a processor adapted to detect an event associated with a viewable area of the encapsulated component, determine that the event will result in at least a portion of the viewable area of the encapsulated component being outside of a viewable area of the user interface component, and adjust the content associated with the user interface component automatically to display the at least the portion of the viewable area of the encapsulated component within the viewable area of the user interface component.

An alternative system includes an input device adapted to generate input events in response to actuation by a user, a user interface component adapted to associate an encapsulated component as at least a portion of content associated with the user interface component, display the content, and provide coordinates associated the encapsulated component in response to the input events, and a processor adapted to receive the coordinates provided by the user interface component, detect an event associated with a viewable area of the encapsulated component generated by the input device, determine a length of a dimension of the viewable area of the encapsulated component relative to an origin of the encapsulated component based upon the coordinates, compare the length of the dimension with a distance from the origin of the encapsulated component to a boundary of the viewable area of the user interface component, determine that the length of the dimension is larger than the distance to the boundary of the viewable area of the user interface component, determine that the event will result in at least a portion of the viewable area of the encapsulated component being outside of a viewable area of the user interface component, and adjust the content associated with the user interface component automatically to display the at least the portion of the viewable area of the encapsulated component within the viewable area of the user interface component.

A computer program product includes a computer useable medium including a computer readable program. The computer readable program when executed on a computer causes the computer to detect an event associated with a viewable area of the encapsulated component, determine that the event will result in at least a portion of the viewable area of the encapsulated component being outside of a viewable area of the user interface component, and adjust the content associated with the user interface component automatically to display the at least the portion of the viewable area of the encapsulated component within the viewable area of the user interface component.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides automated user interface adjustment of content associated with a user interface container component and an encapsulated component in response to an action or event associated with viewable content of the encapsulated component. The automated adjustments may be performed in response to polled or event-based interactions with the encapsulated component. User manipulations of a control element associated with the encapsulated component are evaluated to determine whether they result in content associated with the encapsulated component extending beyond a viewable area of the container component. Content that extends beyond the viewable area of the container component triggers automated adjustment of the content associated with both the encapsulated component and the container component. Control elements associated with the container component and the encapsulated component are also adjusted to represent adjustment of the content associated with both the container component and the encapsulated component.

Figure 1:
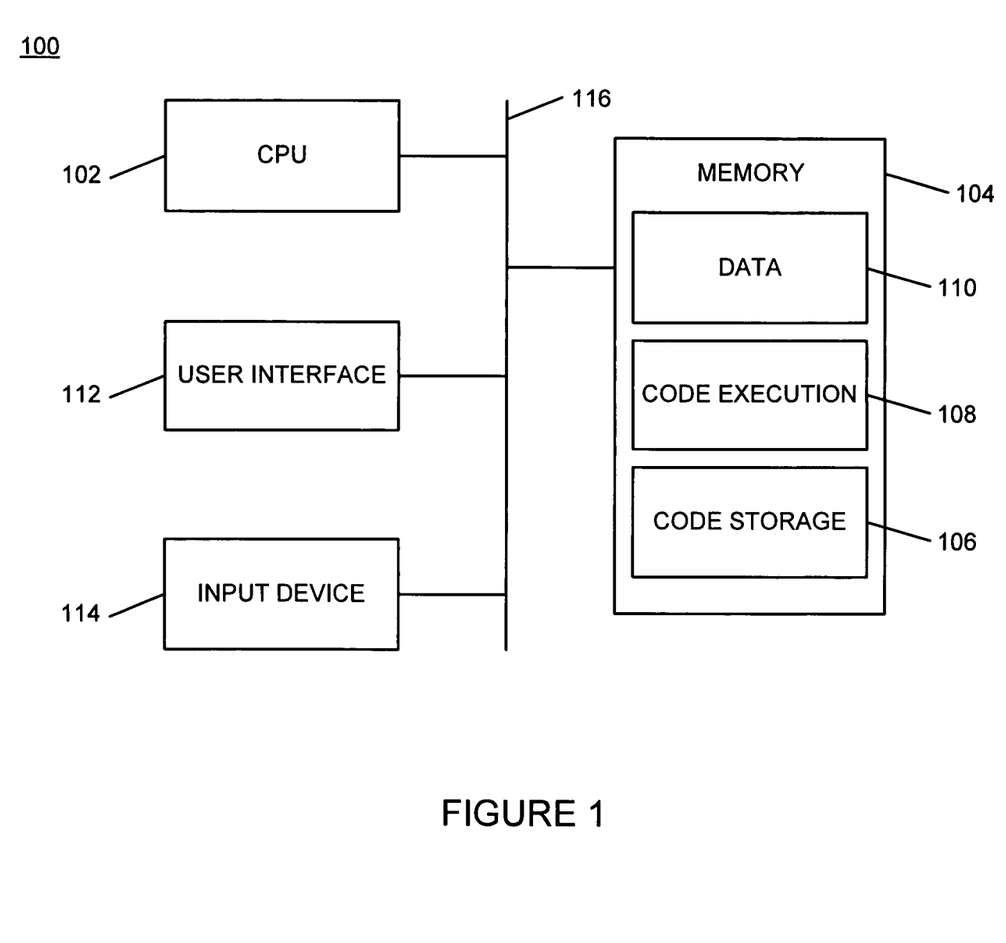
FIG. 1 illustrates an example of an implementation of a block diagram of a system for automated adjustment, such as scrolling, of a user interface container component in response to an action associated with an encapsulated component according to an embodiment of the present subject matter.

FIG. 1 illustrates an example of an implementation of a block diagram of a system 100 for automated adjustment, such as scrolling, of a user interface container component in response to an action associated with an encapsulated component. For purposes of the present description, a container component of a user interface includes elements, such as a browser, but also includes any user-interface component that contains or encapsulates other viewable content (e.g., encapsulated components). As such, any component or element that includes other content, elements, or components may be considered a container of the other content, elements, or components. Furthermore, encapsulated elements or components may be considered to include any element or component contained within another element or component. The system 100 may be a computing device, such as a personal computer, or any other device useable for interaction with a user. For example, the system 100 may be a cellular telephone, personal digital assistance (PDA), email device, music recording or playback device, or any other device with a user interface.

A central processing unit (CPU) 102 provides computer instruction execution, computation, and other capabilities within the system 100. A memory 104 includes a code storage area 106, a code execution area 108, and data area 110. The memory 104 may include any combination of volatile and non-volatile memory suitable for the code storage area 106, the code execution area 108, and the data area 110, as appropriate, and may include other memory segments not illustrated within the present example. The code execution area 108 includes execution space for an operating system (not shown).

A user interface 112 provides information to a user of the system 100 in the form of text and/or graphics. The user interface 112 may include a graphical user interface (GUI). As will be described in more detail below, container components and encapsulated components are presented to the user via the user interface 112.

An input device 114 provides the user of the system 100 with input capabilities. The input device 114 allows the user to interact with the system 100 in association with information presented on the user interface 112. The input device 114 may include a keypad, a mouse, a pen, a joystick, or any other user input device capable of allowing the user to interact with the system 100. As described in more detail below, coordinates of encapsulated components, such as its origin, may be forwarded to or polled and processed by the CPU 102 in response to events associated input events generated by the input device 114.

The CPU 102, the memory 104, the user interface 112, and the input device 114 are interconnected via an interconnection 116. The interconnection 116 may include a system bus, a network, or any other interconnection capable of providing the respective components with suitable interconnection for the respective purpose.

Furthermore, components within the system 100 may be co-located or distributed within a network without departure from the scope of the present subject matter. For example, the components within the system 100 may be located within a stand-alone device, such as a personal computer (e.g., desktop or laptop) or handheld device (e.g., cellular telephone, personal digital assistant (PDA), email device, music recording or playback device, etc.). For a distributed arrangement, the user interface 112 and the input device 114 may be located at a terminal of a fuel pump, point of sale device, or kiosk, while the CPU 102 and memory 104 are located at a local or remote server. Many other possible arrangements for components of the system 100 are possible and all are within the scope of the present subject matter.

FIGS. 2 through 5 illustrate an example of an implementation of a time progression for the user interface 112 based upon user manipulation of the input device 114 in response to information presented within the user interface 112. The time progression illustrated within FIGS. 2 through 5 is provided to facilitate understanding of the automated adjusting of content of the present subject matter. Detailed examples of processes for automatically adjusting content associated with container components and encapsulated components in response to events indicative of content associated with an encapsulated component extending beyond a boundary of a container component are presented below beginning with FIG. 8.

Figure 2:
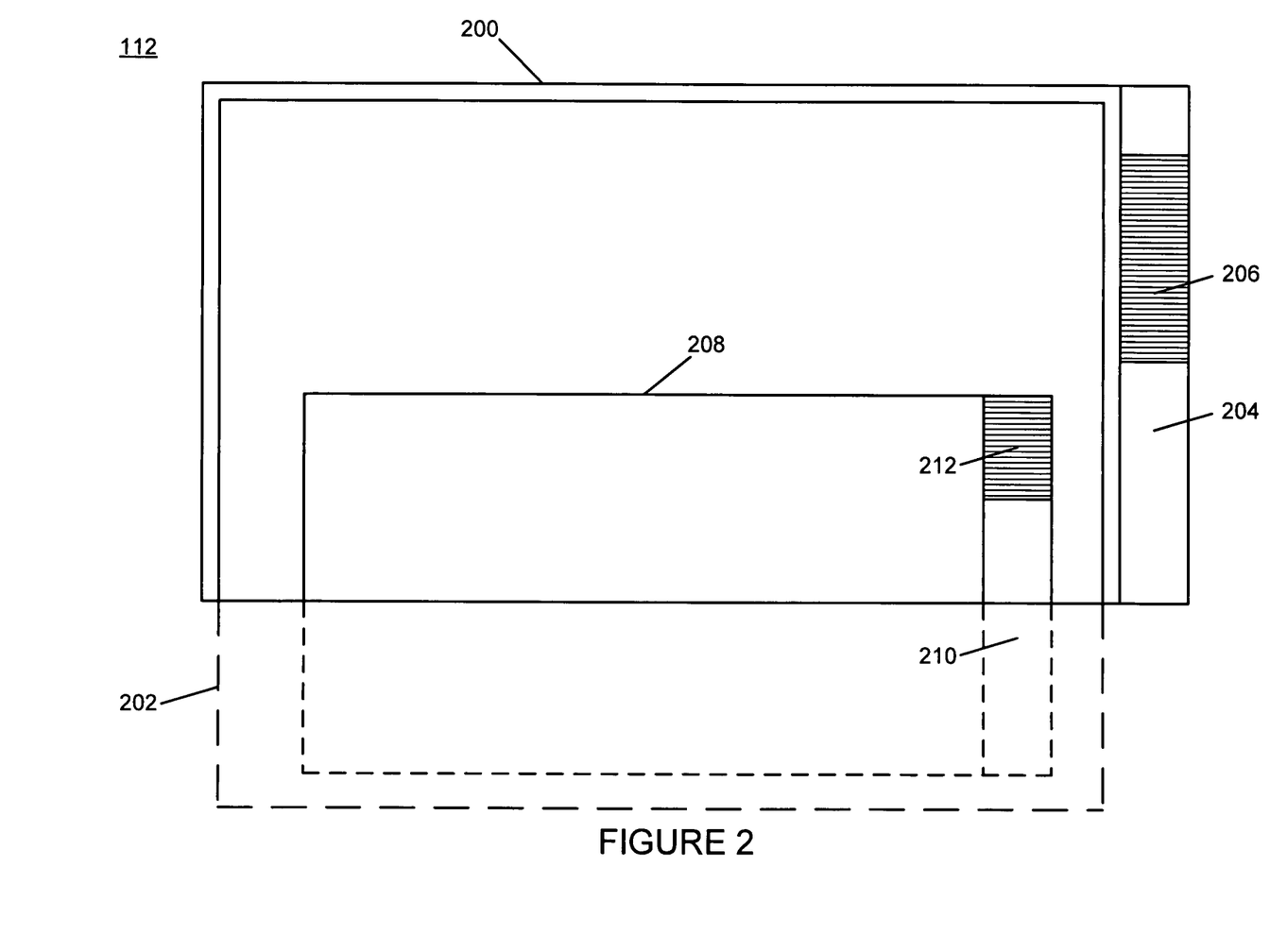
FIG. 2 illustrates an example of an implementation of a user interface in an initial state where content that is available for viewing is larger in a vertical direction than an area available for presentation of the available content and prior to any user interaction according to an embodiment of the present subject matter.

FIG. 2 illustrates an example of an implementation of the user interface 112 in an initial state where content that is available for viewing is larger in the vertical direction than an area available for presentation of the available content and prior to any user interaction. Though not depicted within the present example, it is understood that the scope of the present subject matter also applies to content that is larger than an area available for presentation of available content in any direction. For example, content that is larger in a horizontal direction, a diagonal direction, or in any other direction are all considered within the scope of the present subject matter. Furthermore, adjustment of content, such as by scrolling, in any direction is also considered within the scope of the present subject matter.

Within the example of FIG. 2, a viewable area 200 provides an area for presentation of information to the user in the form of text and/or graphics. Content 202 represents displayable text and/or graphics that are available for display and presentation within the viewable area 200. For purposes of the present example, the content 202 is larger than the viewable area 200. Accordingly, a portion of the content 202 is represented by a dashed outline for areas outside of the viewable area 200. A scroll bar 204 allows the user to move a scrolling element 206 to move the content 202 vertically within the viewable area 200. As such, the scroll bar 204 and the scrolling element 206 represent control elements of the viewable area 200. The scroll bar 204 and the scrolling element 206 also represent visual content position indicators for the viewable area 200 that allow the user to visually determine the relative position of the content displayed within the viewable area 200 relative to the total content available for viewing within the viewable area 200.

The content 202 includes an element 208 located partially within the viewable area 200 and located partially outside of the viewable area 200 as represented by the dashed outline of a portion of the element 208. For purposes of the present description, it is assumed that there have been no viewable events generated by the element 208 within FIG. 1. Accordingly, the element 208 is represented within FIG. 1 prior to any automated adjustment by the system 100. Additionally, the viewable area 200 may be considered a container element within which the content 202 is located and the element 208 may be considered an encapsulated element. Furthermore, as described above, encapsulated elements may include any element or component contained within another element or component.

The element 208 also includes a scroll bar 210 and a scrolling element 212. The scroll bar 210 allows the user to move a scrolling element 212 to move the content (not shown) of the element 208 vertically within the element 208. As such, the scroll bar 210 and the scrolling element 212 represent control elements of the element 208. The scroll bar 210 and the scrolling element 212 also represent visual content position indicators for the element 208 that allow the user to visually determine the relative position of the content displayed within the element 208 relative to the total content available for presentation within the element 208.

For ease of illustration purposes, dimensions of content within the element 208 are not depicted using a dashed-line representation of content available for presentation within the element 208, but outside of the area of the element 208. However, it is understood that the element 208 may include content that is larger than the available area of the element 208 within the content 202 and that the content of the element 208 is viewable by movement of the scrolling element 212 within the scroll bar 210.

Figure 3:
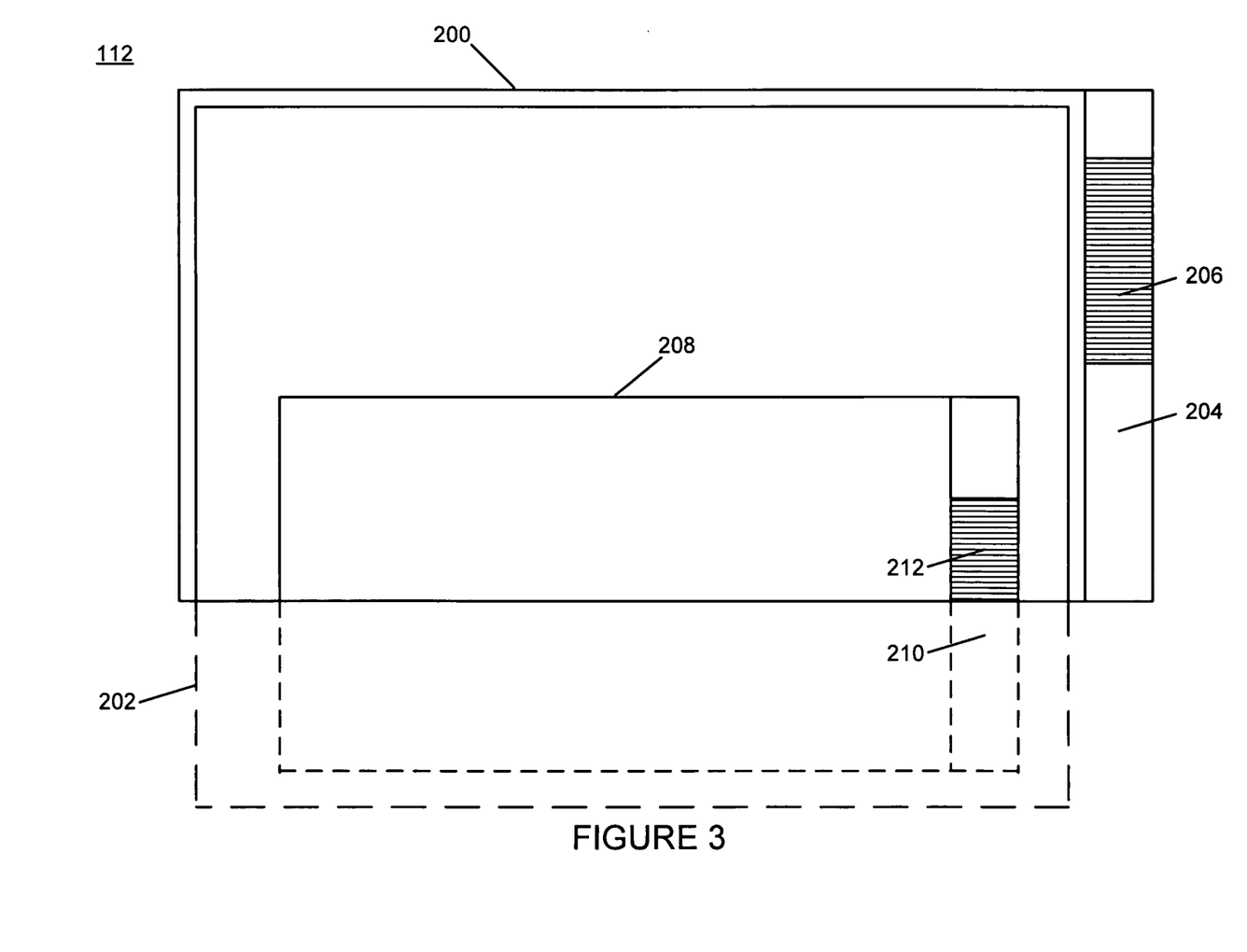
FIG. 3 illustrates an example of an implementation of a user interface just prior to automated scrolling of content within a viewable area, where the user has moved a scroll element of an encapsulated element to an edge of the viewable area according to an embodiment of the present subject matter.

FIG. 3 illustrates an example of an implementation of the user interface 112 just prior to automated scrolling of the content 202 within the viewable area 200, where the user has moved the scroll element 212 of the encapsulated element 208 to the edge of the viewable area 200. As illustrated within FIG. 3, the user has moved the scroll element 212 of the element 208 downward using the input device 114 toward the content of the element 208 that is not viewable within the viewable area 200. Because the scroll element 212 has not yet been moved beyond a lower boundary of the viewable area 200, the user interface 112 has not yet automatically adjusted (e.g., scrolled) the content 202 or the element 208.

Figure 4:
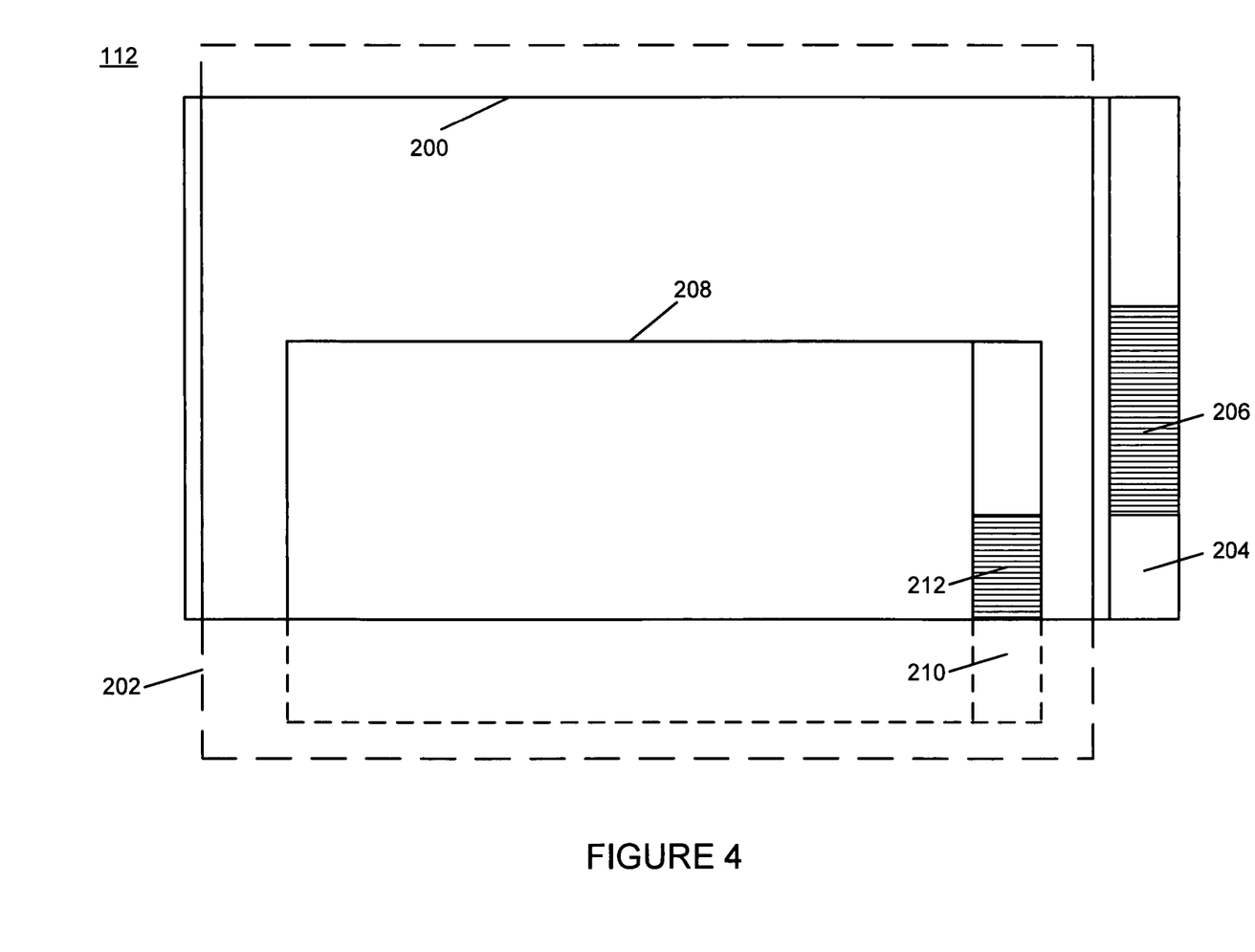
FIG. 4 illustrates an example of an implementation of a user interface just after a user has attempted to move a scroll element of an encapsulated element beyond a lower boundary of a viewable area according to an embodiment of the present subject matter.

FIG. 4 illustrates an example of an implementation of the user interface 112 just after the user has attempted to move the scroll element 212 of the encapsulated element 208 beyond the lower boundary of the viewable area 200. As will be described in more detail below beginning with FIG. 8, the user attempting to move the scroll element 212 beyond a boundary of the viewable area 200 generates an event, such as a viewable event, associated with the element 208 within the system 100. The CPU 102 then processes this event to automatically adjust components and content within the user interface 112 without the user having to manually activate the scroll element 206.

As can be seen from FIG. 4, the scroll element 212 is still positioned at the lower boundary of the viewable area 200. However, several other elements of the user interface 112 have moved as a result of the event triggered by the user attempting to move the scroll element 212 beyond the lower boundary of the viewable area 200.

The content 202 has been moved upward within the viewable area 200. This movement of the content 202 is illustrated within FIG. 4 by a dashed-line representation of a top portion of the content 202 above the viewable area 200 and by illustrating that less of the portion of the content 202 is located below the viewable area 200. Additionally, the scroll element 206 within the scroll bar 204 has automatically moved down to proportionally represent the area of the content 202 that is presently presented within the viewable area 200. Furthermore, while the scroll element 212 is still positioned at the lower boundary of the viewable area 200, it is illustrated as having moved within the scroll bar 210 to proportionally represent the area of the content (not illustrated) of the encapsulated element 208 that is presented within the encapsulated element 208.

Accordingly, the system 100 automatically scrolled several components of the user interface 112, including the content of the container element itself, in response to the user attempting to move a single encapsulated control element of an encapsulated element beyond a boundary of the container element. In the present example, the system 100 automatically moved the content 202 within the viewable area 200 in addition to automatically moving the content (not illustrated) within the encapsulated element 208 in response to the event triggered by the user attempting to move the scroll element 212 beyond a boundary of the viewable area 200.

Figure 5:
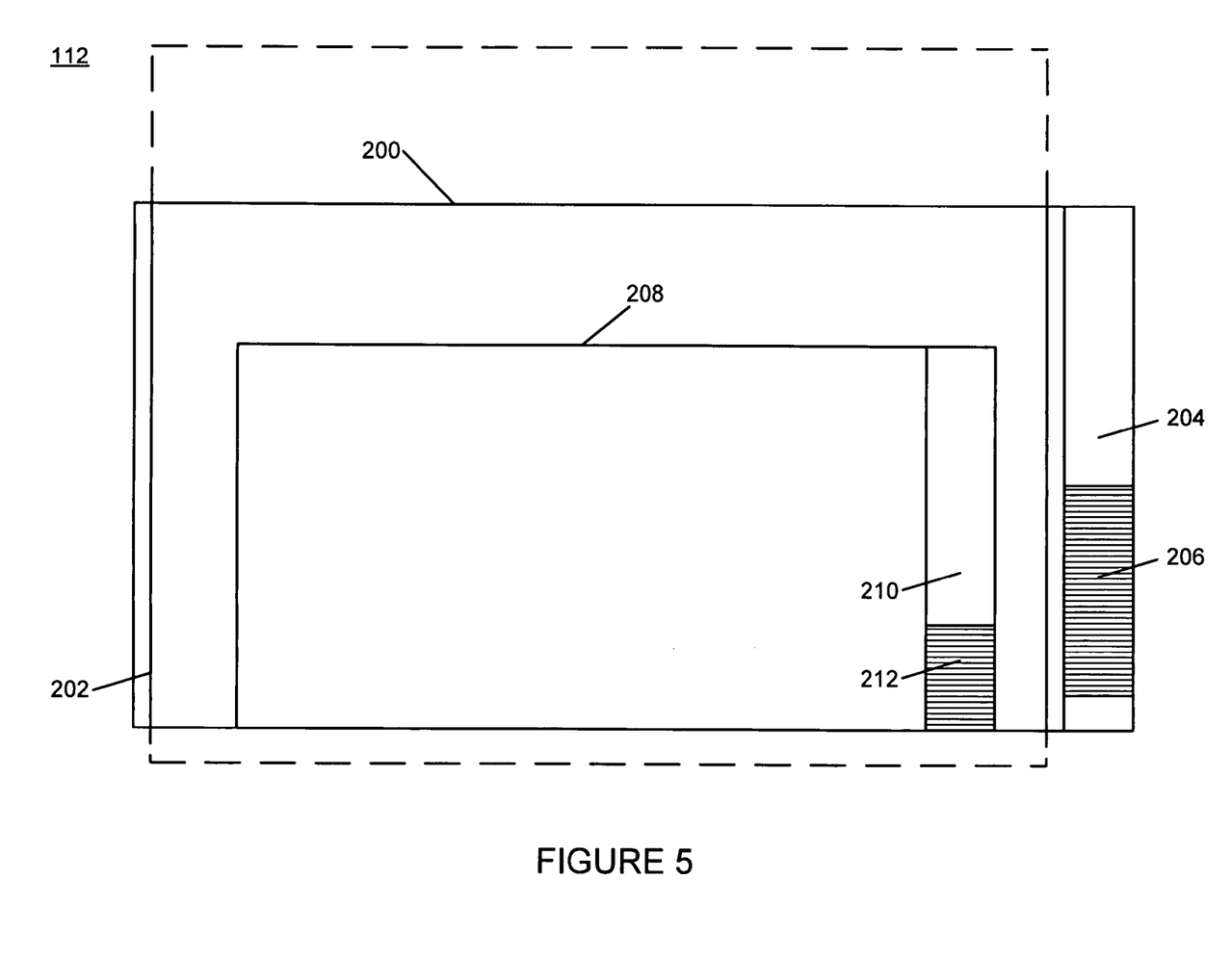
FIG. 5 illustrates an example of an implementation of a user interface after a user has attempted to continue moving a scroll element of an encapsulated element to a bottom of a scroll bar and automated scrolling has completed according to an embodiment of the present subject matter.

FIG. 5 illustrates an example of an implementation of the user interface 112 after the user has attempted to continue moving the scroll element 212 of the encapsulated element 208 to the bottom of the scroll bar 210 and automated scrolling has completed. The user continuing to attempt to move the scroll element 212 of the encapsulated element 208 to the bottom of the scroll bar 210 triggered one or more additional viewable events. The CPU 102 processed the one or more events and automatically adjusted the content 202 and the content (not illustrated) of the encapsulated element 208 without the user having to activate the scroll element 206.

As can be seen from FIG. 5, the scroll element 212 is still positioned at the lower boundary of the viewable area 200. However, several other elements of the user interface 112 have automatically moved further as a result of the user continuing to attempt to move the scroll element 212 beyond the lower boundary of the viewable area 200 until it reached the bottom of the scroll bar 210.

The content 202 has been moved further upward within the viewable area 200. This movement of the content 202 is illustrated within FIG. 5 by a larger dashed-line representation of a top portion of the content 202 above the viewable area 200 and by a smaller portion of the content 202 located below the viewable area 200. Additionally, the scroll element 206 within the scroll bar 204 has automatically moved down to proportionally represent the area of the content 202 that is currently presented within the viewable area 200. Furthermore, while the scroll element 212 is still positioned at the lower boundary of the viewable area 200, it is illustrated as having moved to the bottom of the scroll bar 210 to proportionally represent the area of the content (not illustrated) of the encapsulated element 208 that is presented within the encapsulated element 208.

Accordingly, the system 100 automatically continued to scroll several components of the user interface 112, including the content of the container element itself, in response to the user continuing to attempt to move a single encapsulated control element of an encapsulated element beyond a boundary of the container element. Additional viewable events were generated and processed in response to the user continuing to manipulate the scroll element 212. These events were processed by the CPU 102 and content was automatically adjusted without the user having to manually activate the scroll element 206. In the present example, the system 100 automatically continued to move the content 202 within the viewable area 200 in addition to automatically moving the content (not illustrated) within the encapsulated element 208 in response to the user continuing to attempt to move the scroll element 212 beyond a boundary of the viewable area 200.

As described above, the present subject matter is not limited to automated adjustment, such as scrolling, of user interface components in the vertical direction. Automated horizontal scrolling, automated diagonal scrolling, and automated scrolling in any other direction are all considered within the scope of the present subject matter.

Figure 6:
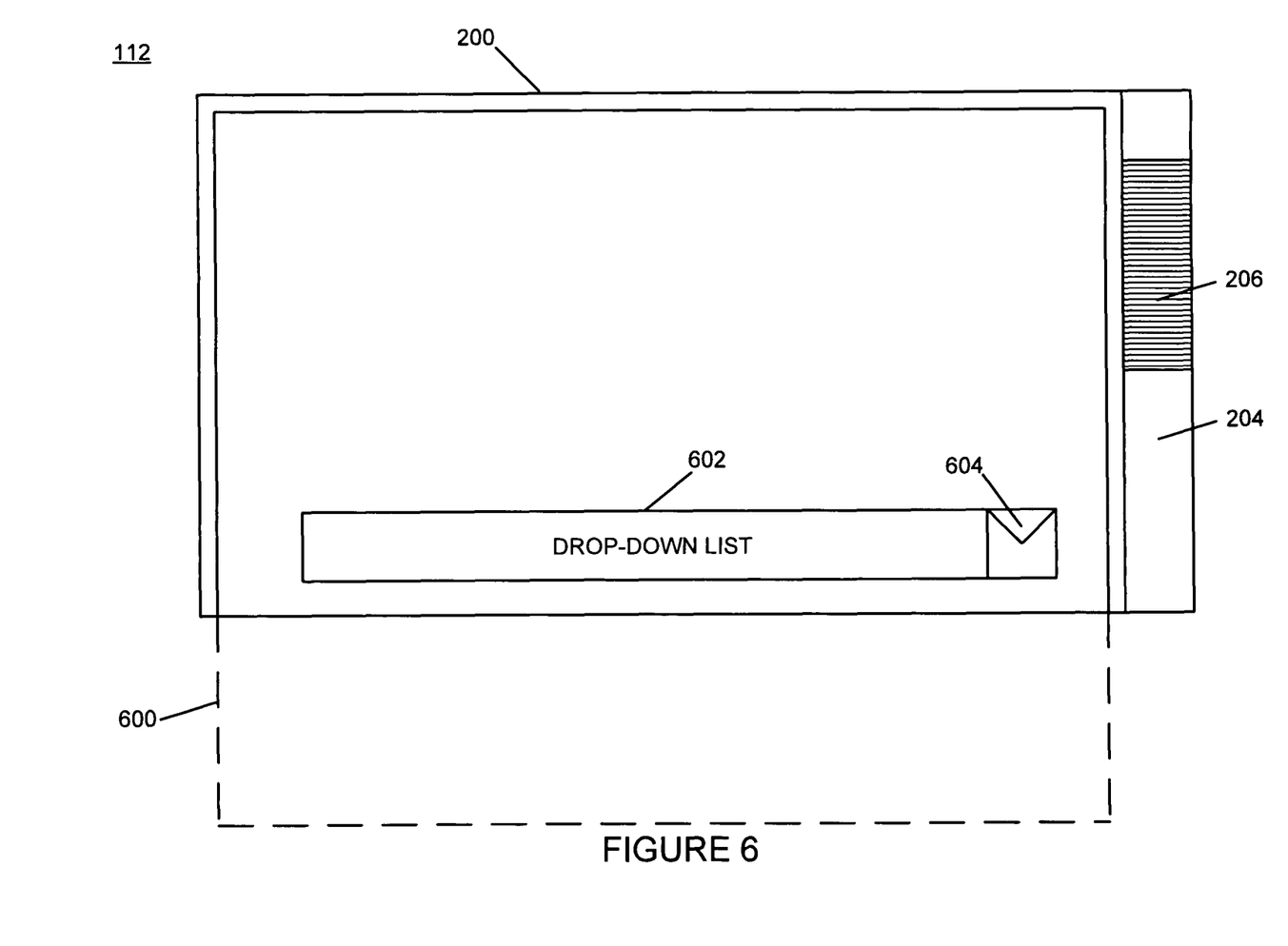
FIG. 6 illustrates an example of an implementation of a user interface in an initial state where content that is available for viewing is larger in a vertical direction than an area available for presentation of the available content and prior to any user interaction according to an embodiment of the present subject matter.
Figure 7:
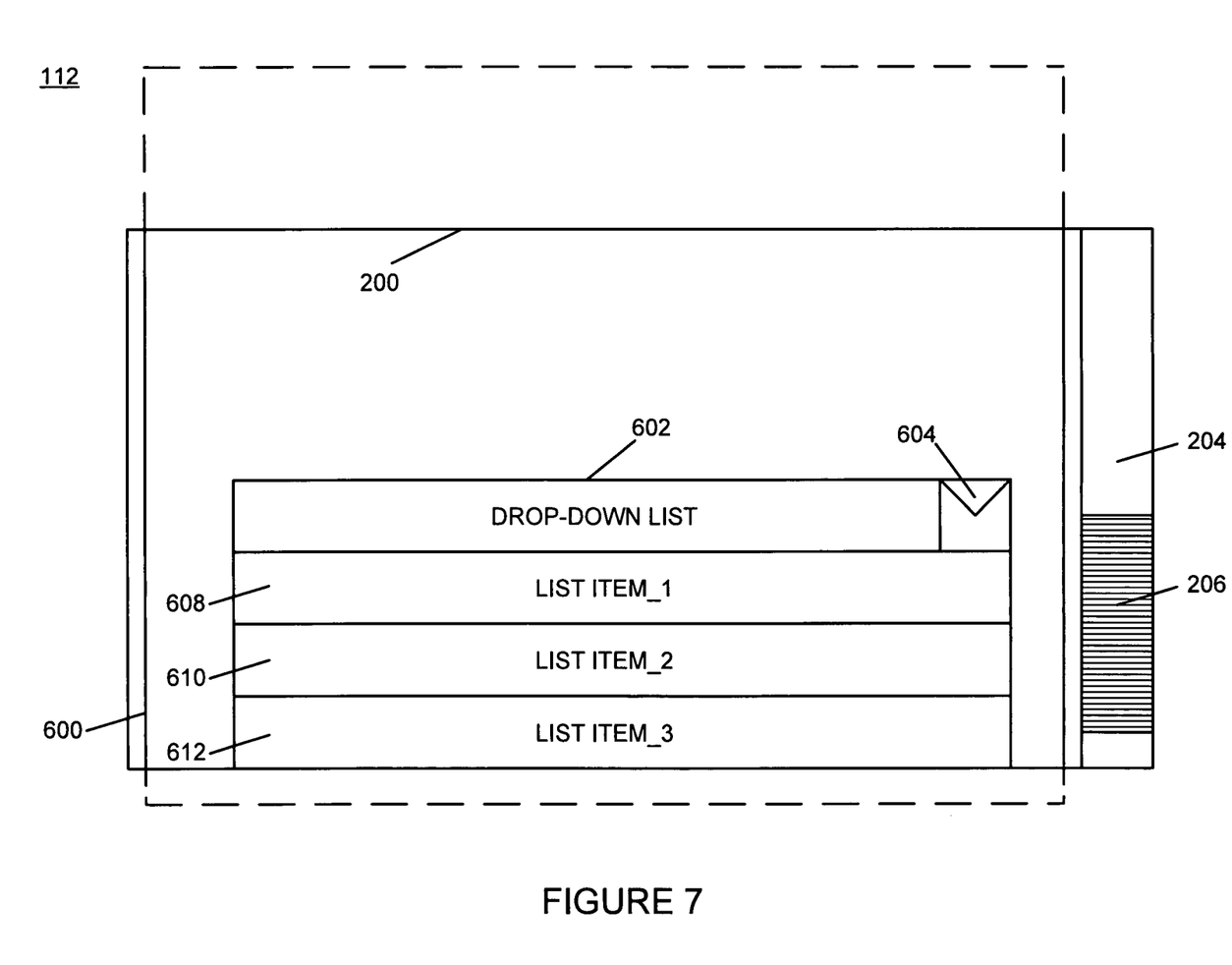
FIG. 7 illustrates an example of an implementation of a user interface after the user has activated a drop-down control to expand a drop-down list and automated scrolling of content has completed after expansion of the drop-down list according to an embodiment of the present subject matter.

FIGS. 6 and 7 illustrate another example of an implementation of a time progression for the user interface 112 based upon user manipulation of controls within the user interface 112. The time progression illustrated within FIGS. 6 and 7 is provided to facilitate understanding of the automated adjustment of content, such as by scrolling, of the present subject matter. Detailed examples of processes for automatically adjusting content associated with container components and encapsulated components in response to events indicative of content associated with an encapsulated component extending beyond a boundary of a container component are presented below beginning with FIG. 8.

FIG. 6 illustrates an example of an implementation of the user interface 112 in an initial state where content 600 that is available for viewing is larger in the vertical direction than an area available for presentation of the available content and prior to any user interaction. Though not depicted within the present example, it is understood that the scope of the present subject matter applies to content that is larger than an area available for presentation of available content in any direction. For example, content that is larger in a horizontal direction, a diagonal direction, or in any other direction are all considered within the scope of the present subject matter. Furthermore, adjustment of content, such as by scrolling, in any direction is also considered within the scope of the present subject matter.

Within the example of FIG. 6, the viewable area 200, the scroll bar 204, and the scrolling element 206 are illustrated and operate as described above in association with FIGS. 2 through 5. The content 600 includes a drop-down list 602 located in a non-expanded form within the viewable area 200. For purposes of the present description, the viewable area 200 may be considered a container element within which the content 600 includes encapsulated elements, such as the drop-down list 602. The content 600 is represented by a dashed outline for any portion of the content 600 that is outside of the viewable area 200. For purposes of the present description, the viewable area 200 may be considered a container element within which the content 600 includes encapsulated elements, such as the drop-down list 602.

The drop-down list 602 also includes a drop-down control 604 that enables a user to activate the list expansion capabilities of the drop-down list 602 to expand the drop-down list to show list elements encapsulated within the drop-down list 602. As such, the drop-down control 604 represents a control element of the drop-down list 602. For purposes of the present description, it is understood that the drop-down list 602 includes content that, when expanded, is larger than the remaining viewable space within the viewable area 200, such that when activated by a user, the drop-down list 602 will extend beyond the lower boundary of the viewable area 200. As with the example of FIGS. 2 through 5, when the user activates the drop-down control 604 to expand the drop-down list 602, the system 100 automatically scrolls the content 600 as illustrated within FIG. 7 below.

FIG. 7 illustrates an example of an implementation of the user interface 112 after the user has activated the drop-down control 604 to expand the drop-down list 602 and automated scrolling of the content 600 has completed after expansion of the drop-down list 602. As will be described in more detail below beginning with FIG. 8, the user activating the drop-down control 604 results in content associated with the drop-down list 602 to be beyond a boundary of the viewable area 200 and generates an event, such as a viewable event, associated with the drop-down list 602 within the system 100. The CPU 102 then processes this event to automatically adjust components and content within the user interface 112 without the user having to manually activate the scroll element 206.

As can be seen from FIG. 7, the drop-down list 602 includes a list item_1 680, a list item_2 610, and a list item_3 612. It should be noted that the list item_3 612 is positioned at the lower boundary of the viewable area 200. Additionally, several other elements of the user interface 112 have automatically moved further as a result of the user activating the drop-down control 604 to expand the drop-down list 602. The content 600 has been moved further upward within the viewable area 200. This movement of the content 600 is illustrated within FIG. 7 by a larger dashed-line representation of a top portion of the content 600 above the viewable area 200 and by a smaller portion of the content 600 located below the viewable area 200. Further, the scroll element 206 within the scroll bar 204 has automatically moved down to proportionally represent the area of the content 600 that is currently presented within the viewable area 200.

Accordingly, the system 100 automatically scrolled several components of the user interface 112, including the content of the container element itself, in response to the user activating a single encapsulated drop-down control element of an encapsulated element such that expansion of the drop-down element would have caused content associated with the element to be displayed beyond a boundary of the container element. Additional viewable events were generated and processed in response to the user manipulation of the drop-down control 604. These events were processed by the CPU 102 and content was automatically adjusted without the user having to manually activate the scroll element 206. In the present example, the system 100 automatically moved the content 600 within the viewable area 200 in response to the user activating the drop-down control 604.

As described above, the present subject matter is not limited to automated adjustment (e.g., scrolling) of user interface components in the vertical direction. Automated horizontal scrolling, automated diagonal scrolling, and automated scrolling in any other direction are all considered within the scope of the present subject matter.

While the above description within FIGS. 2 through 7 has illustrated that automated adjustment (e.g., scrolling) is completed when the dynamic content associated with an encapsulated component has been displayed, this should not be considered limiting as this representation of completion of the automated scrolling is for ease of illustration purposes only. Once an automated adjustment opportunity has been detected, automated adjustment may be continued beyond the boundary of any dynamic content associated with an encapsulated component by any suitable measure to further enhance the user's experience of using the system 100.

Figure 8:
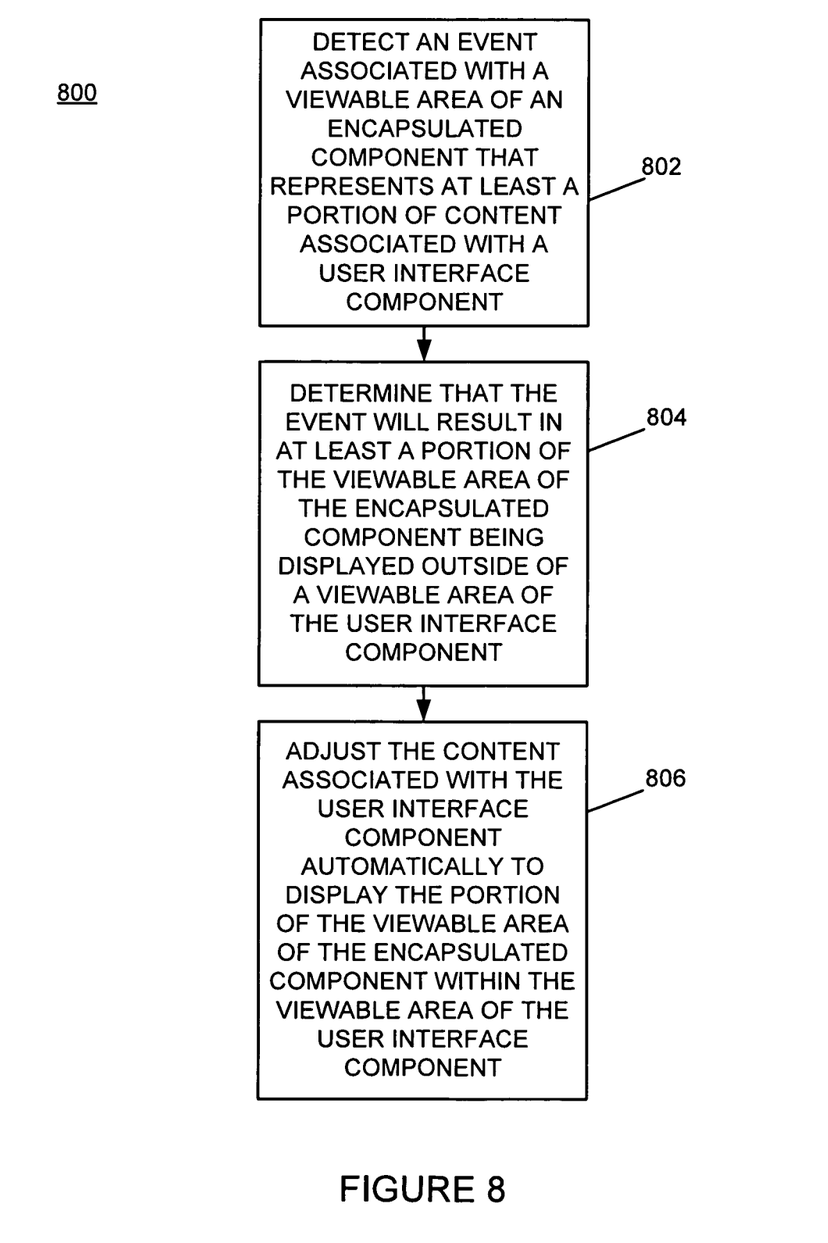
FIG. 8 illustrates an example of an implementation of a process for automated adjustment of user interface components in response to changes in viewable area of encapsulated user interface components according to an embodiment of the present subject matter.

FIG. 8 illustrates an example of an implementation of a process 800 for automated adjustment of user interface components in response to changes in viewable area of encapsulated user interface components. At block 802, the process 800 detects an event associated with a viewable area of an encapsulated component that represents at least a portion of content associated with a user interface component. At block 804, the process 800 determines that the event will result in at least a portion of the viewable area of the encapsulated component being outside of a viewable area of the user interface component. At block 806, the process 800 adjusts the content associated with the user interface component automatically to display the portion of the viewable area of the encapsulated component within the viewable area of the user interface component.

Figure 9:
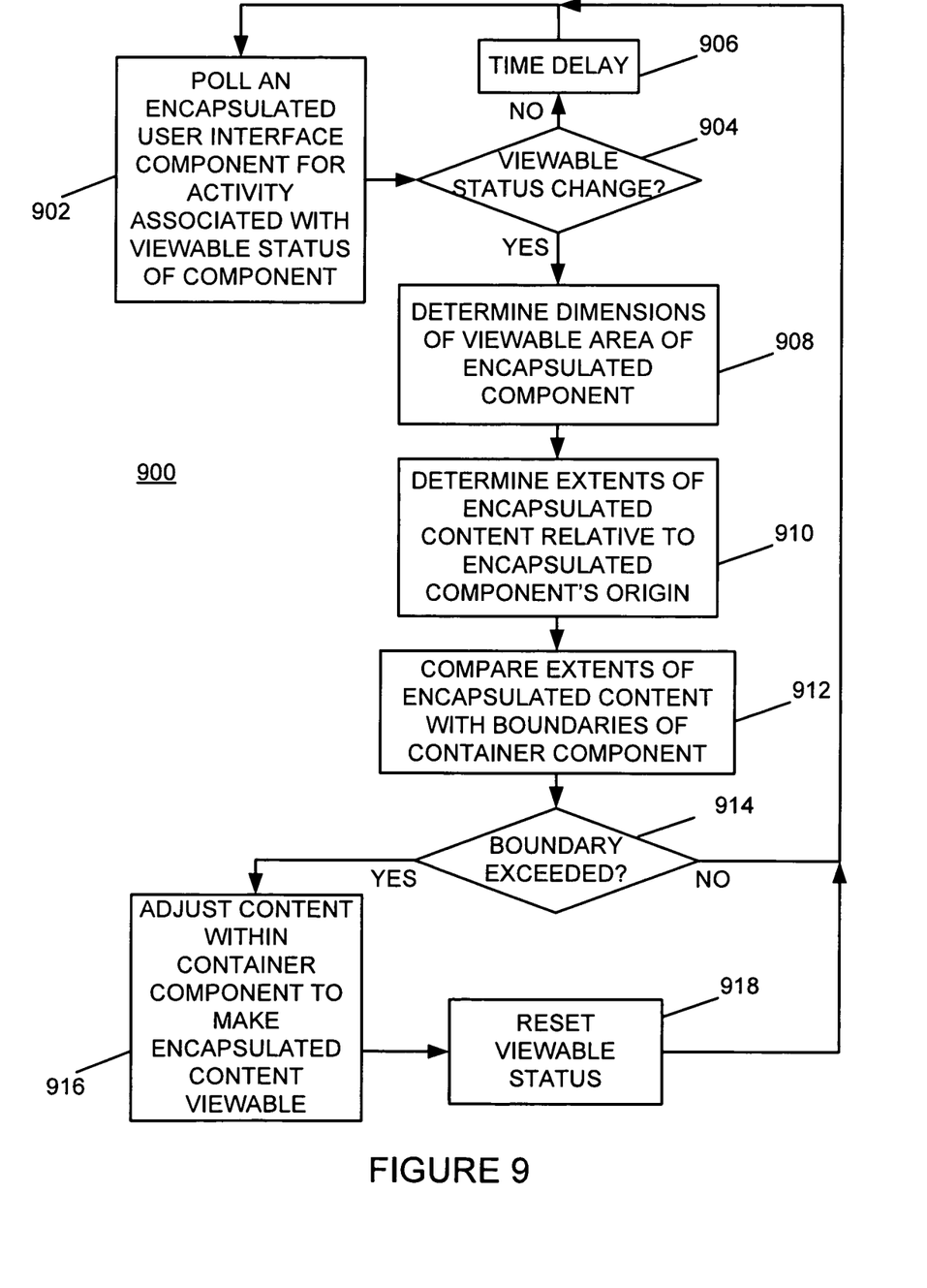
FIG. 9 illustrates an example of an implementation of a process for automated adjustment of container user interface components in response to status changes associated with viewable area of encapsulated user interface components by polling the encapsulated user interface components for status changes according to an embodiment of the present subject matter.

FIG. 9 illustrates an example of an implementation of a process 900 for automated adjustment of container user interface components in response to status changes associated with viewable area of encapsulated user interface components by polling the encapsulated user interface components for status changes. At block 902, the process 900 polls an encapsulated user interface component, such as the element 208 within the viewable area 200 of the user interface 112, for activity or an event associated with a viewable status of the encapsulated user interface component. At decision point 904, the process 900 determines whether there has been a change in viewable status for the encapsulated user interface component.

If the process 900 determines that there has been no change in the viewable status of the encapsulated user interface component, the process 900 waits for a time delay at block 906. The process 900 then iteratively polls the encapsulated user interface component for activity associated with the viewable status of the encapsulated user interface component after the time delay at block 902 as described above. When the process 900 determines at decision point 904 that change in viewable status for the encapsulated user interface component has occurred, the process 900 determines at least one dimension of the viewable area of the encapsulated user interface component at block 908. This dimension may be horizontal, vertical, diagonal, or any other dimension associated with the encapsulated user interface component. Additionally, this dimension may be represented as a length of an aspect of the encapsulated user interface component. This dimension may also be represented as a distance from an origin of the encapsulated user interface component calculated via user interface coordinates of the encapsulated user interface component, or via any other approach resulting in a value representative of the dimension.

At block 910, the process 900 determines at least one extent of the encapsulated user interface component. The extent may be associated with one or more dimensions of the encapsulated user interface component, with the one or more dimensions determined as described above. Further, the extent may be relative to an origin within the content of the container component, such as the user interface 112, at which the encapsulated user interface component is located. Accordingly, the extent identifies at least one of a point and a distance and bearing relative to the origin of the encapsulated user interface component that represents a location of a boundary of the encapsulated user interface component relative to origin within the content of the container component.

At block 912, the process 900 compares the extent with boundaries of the container component. At decision point 914, the process 900 determines whether a boundary of the container component has been exceeded by an extent associated with the viewable area of the encapsulated user interface component. For purposes of the present description, any approach to determining whether a boundary of the container component has been exceeded by an extent associated with the viewable area of the encapsulated user interface component may be used. For example, a determination may be made that a length of or to the extent is larger than a distance to the boundary of the container component.

If the process 900 determines that no boundary of the container component has been exceeded by an extent associated with the viewable area of the encapsulated user interface component, the process 900 returns to block 902 to poll the encapsulated user interface component for activity associated with the viewable status of the encapsulated user interface component as described above.

If the process 900 determines that a boundary of the container component has been exceeded by an extent associated with the viewable area of the encapsulated user interface component, the process 900 adjusts the content of the container component to make encapsulated content associated with the encapsulated user interface component viewable at block 916. At block 918, the process 900 resets the viewable status of the encapsulated user interface component and returns to block 902 to poll the encapsulated user interface component for activity associated with the viewable status of the encapsulated user interface component as described above. Accordingly, the process 900 provides automated adjustment of container user interface components in response to status changes associated with viewable area of the encapsulated user interface components by polling the encapsulated user interface components for status changes.

Figure 10:
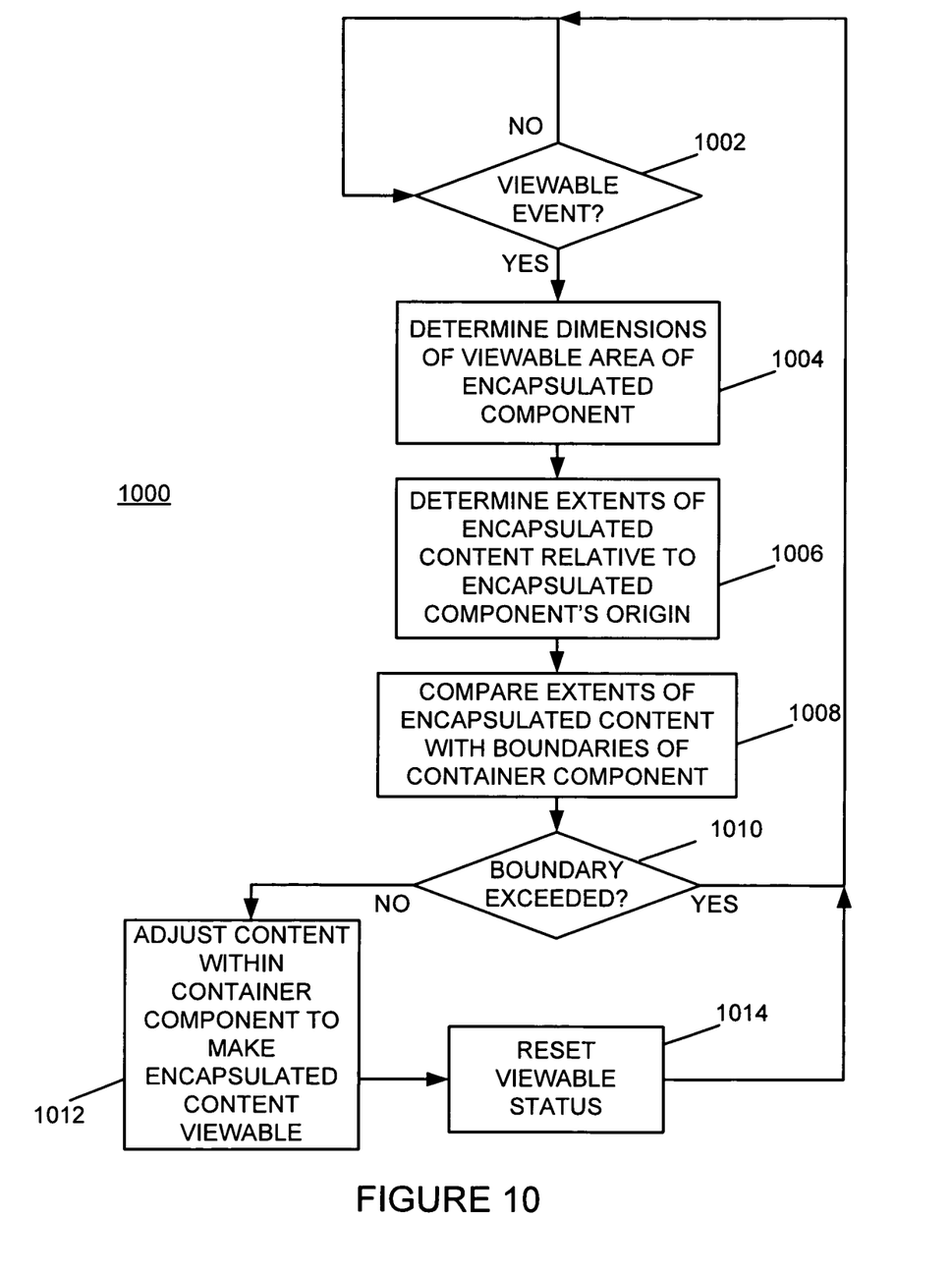
FIG. 10 illustrates an example of an implementation of a process for automated adjustment of container user interface components in response to events triggered by encapsulated user interface components representing status changes associated with viewable area of the encapsulated user interface components according to an embodiment of the present subject matter.

FIG. 10 illustrates an example of an implementation of a process 1000 for automated adjustment of container user interface components in response to events triggered by encapsulated user interface components representing status changes associated with viewable area of the encapsulated user interface components. At decision point 1002, the process 1000 waits for an event associated with viewable status of an encapsulated user interface component.

When the process 1000 determines that there has been an event associated with viewable status for an encapsulated user interface component, the process 1000 determines at least one dimension of the viewable area of the encapsulated user interface component at block 1004. This dimension may be horizontal, vertical, diagonal, or any other dimension associated with the encapsulated user interface component. As described above in association with FIG. 9, this dimension may be represented as a length of an aspect of the encapsulated user interface component. This dimension may also be represented as a distance from an origin of the encapsulated user interface component calculated via user interface coordinates of the encapsulated user interface component, or via any other approach resulting in a value representative of the dimension.

At block 1006, the process 1000 determines at least one extent of the encapsulated user interface component. The extent may be associated with one or more dimensions of the encapsulated user interface component, with the one or more dimensions determined as described above. Further, the extent may be relative to an origin within the content of the container component, such as the user interface 112, at which the encapsulated user interface component is located. Accordingly, the extent identifies at least one of a point and a distance and bearing relative to the origin of the encapsulated user interface component that represents a location of a boundary of the encapsulated user interface component relative to origin within the content of the container component.

At block 1008, the process 1000 compares the extent with boundaries of the container component. At decision point 1010, the process 1000 determines whether a boundary of the container component has been exceeded by an extent associated with the viewable area of the encapsulated user interface component. For purposes of the present description, any approach to determining whether a boundary of the container component has been exceeded by an extent associated with the viewable area of the encapsulated user interface component may be used. For example, a determination may be made that a length of or to the extent is larger than a distance to the boundary of the container component.

If the process 1000 determines that no boundary of the container component has been exceeded by an extent associated with the viewable area of the encapsulated user interface component, the process 1000 returns to decision point 1002 to await an event associated with viewable status of an encapsulated user interface component as described above.

If the process 1000 determines that a boundary of the container component has been exceeded by an extent associated with the viewable area of the encapsulated user interface component, the process 1000 adjusts the content of the container component to make encapsulated content associated with the encapsulated user interface component viewable at block 1012. At block 1014, the process 1000 resets the viewable status of the encapsulated user interface component and returns to decision point 1002 to await an event associated with viewable status of an encapsulated user interface component as described above. Accordingly, the process 1000 provides automated adjustment of container user interface components in response to events triggered by encapsulated user interface components representing status changes associated with viewable area of the encapsulated user interface components.

The subject matter that has been described provides automated user interface adjustment of a user interface container component in response to an action or event associated with viewable content of an encapsulated component. The user interface adjustment may be performed in response to polled or event-based interactions with the encapsulated component. Control elements associated with both the container component and the encapsulated component are adjusted to represent adjustment of the content associated with both the container component and the encapsulated component.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
   displaying a graphical user interface (GUI) container window comprising at least one container content control element that scrolls container content of the GUI container window;
   displaying, as a portion of the container content of the GUI container window, an encapsulated GUI component comprising an encapsulated content control element;
   detecting an event associated with the encapsulated content control element of the encapsulated GUI component that changes a viewable area of the encapsulated GUI component;
   determining that the event associated with the encapsulated content control element of the encapsulated GUI component will result in at least a portion of the changed viewable area of the encapsulated GUI component extending outside of at least one boundary of a viewable area of the GUI container window; and
   adjusting both the container content associated with GUI container window and the encapsulated GUI component automatically, in response to determining that the at least the portion of the changed viewable area of the encapsulated GUI component would extend outside of the at least one boundary of the viewable area of the GUI container window, to display the at least the portion of the changed viewable area of the encapsulated GUI component within the at least one boundary of the viewable area of the GUI container window, where adjustment of the container content is controlled responsive to the detected event associated with the encapsulated content control element of the encapsulated GUI component.

2. The method of claim 1, where detecting the event associated with the encapsulated content control element of the encapsulated GUI component that changes the viewable area of the encapsulated GUI component comprises polling the encapsulated GUI component to identify the event.

3. The method of claim 1, where detecting the event associated with the encapsulated content control element of the encapsulated GUI component that changes the viewable area of the encapsulated GUI component comprises receiving the event in response to the event being sent from the encapsulated GUI component.

4. The method of claim 1, where determining that the event associated with the encapsulated content control element of the encapsulated GUI component will result in at least the portion of the changed viewable area of the encapsulated GUI component extending outside of the at least one boundary of the viewable area of the GUI container window comprises:
   determining a length of a dimension of the viewable area of the encapsulated GUI component relative to an origin of the encapsulated GUI component;
   comparing the length of the dimension with a distance from the origin of the encapsulated GUI component to the at least one boundary of the viewable area of the GUI container window; and
   determining that the length of the dimension is larger than the distance from the origin of the encapsulated GUI component to the at least one boundary of the viewable area of the GUI container window.

5. The method of claim 1, where adjusting both the container content associated with the GUI container window and the encapsulated GUI component automatically, in response to determining that the at least the portion of the changed viewable area of the encapsulated GUI component would extend outside of the at least one boundary of the viewable area of the GUI container window, comprises scrolling the container content associated with the GUI container window to display the at least the portion of the changed viewable area of the encapsulated GUI component within the at least one boundary of the viewable area of the GUI container window.

6. The method of claim 5, where scrolling the container content associated with the GUI container window comprises scrolling the container content associated with the GUI container window in at least one of a horizontal direction and a vertical direction.

7. The method of claim 1, further comprising adjusting the at least one container content control element of the GUI container window within which the encapsulated GUI component is displayed to represent that the container content associated with the GUI container window has been adjusted in response to the detected event associated with the encapsulated content control element of the encapsulated GUI component.

8. A system, comprising:
   a display; and
   a processor programmed to:
      display a graphical user interface (GUI) container window comprising at least one container content control element that scrolls container content of the GUI container window on the display;
      display, as a portion of the container content of the GUI container window, an encapsulated GUI component comprising an encapsulated content control element;
      detect an event associated with the encapsulated content control element of the encapsulated GUI component that changes a viewable area of the encapsulated GUI component;
      determine that the event associated with the encapsulated content control element of the encapsulated GUI component will result in at least a portion of the changed viewable area of the encapsulated GUI component extending outside of at least one boundary of a viewable area of the GUI container window; and
      adjust both the container content associated with the GUI container window and the encapsulated GUI component automatically, in response to determining that the at least the portion of the changed viewable area of the encapsulated GUI component would extend outside of the at least one boundary of the viewable area of the GUI container window, to display the at least the portion of the changed viewable area of the encapsulated GUI component within the at least one boundary of the viewable area of the GUI container window, where adjustment of the container content is controlled responsive to the detected event associated with the encapsulated content control element of the encapsulated GUI component.

9. The system of claim 8, where, in being programmed to detect the event associated with the encapsulated content control element of the encapsulated GUI component that changes the viewable area of the encapsulated GUI component, the processor is programmed to poll the encapsulated GUI component to identify the event.

10. The system of claim 8, where, in being programmed to detect the event associated with the encapsulated content control element of the encapsulated GUI component that changes the viewable area of the encapsulated GUI component, the processor is programmed to receive the event in response to the event being sent from the encapsulated GUI component.

11. The system of claim 8, where, in being programmed to determine that the event associated with the encapsulated content control element of the encapsulated GUI component will result in at least the portion of the changed viewable area of the encapsulated GUI component extending outside of the at least one boundary of the viewable area of the GUI container window, the processor is programmed to:
  determine a length of a dimension of the viewable area of the encapsulated GUI component relative to an origin of the encapsulated GUI component;
  compare the length of the dimension with a distance from the origin of the encapsulated GUI component to the at least one boundary of the viewable area of the GUI container window; and
  determine that the length of the dimension is larger than the distance from the origin of the encapsulated GUI component to the at least one boundary of the viewable area of the GUI container window.

12. The system of claim 8, where, in being programmed to adjust both the container content associated with the GUI container window and the encapsulated GUI component automatically, in response to determining that the at least the portion of the changed viewable area of the encapsulated GUI component would extend outside of the at least one boundary of the viewable area of the GUI container window, the processor is programmed to scroll the container content associated with the GUI container window to display the at least the portion of the changed viewable area of the encapsulated GUI component within the at least one boundary of the viewable area of the GUI container window.

13. The system of claim 12, where, in being programmed to scroll the container content associated with the GUI container window, the processor is programmed to scroll the container content associated with the GUI container window in at least one of a horizontal direction and a vertical direction.

14. The system of claim 8, where the processor is further programmed to adjust the at least one container content control element of the GUI container window within which the encapsulated GUI component is displayed to represent that the container content associated with the GUI container window has been adjusted in response to the detected event associated with the encapsulated content control element of the encapsulated GUI component.

15. A system, comprising:
  an input device adapted to generate input events in response to actuation by a user;
  a display; and a user interface component configured to provide coordinates associated with displayed components in response to the input events; and
  a processor programmed to:
    display a graphical user interface (GUI) container window comprising at least one container content control element that scrolls container content of the GUI container window on the display;
    display, as a portion of the container content of the GUI container window, an encapsulated GUI component comprising an encapsulated content control element;
    detect an event generated by the input device associated with the encapsulated content control element of the encapsulated GUI component that changes a viewable area of the encapsulated GUI component;
    determine a length of a dimension of the viewable area of the encapsulated GUI component relative to an origin of the encapsulated GUI component based upon the coordinates provided by the user interface component;
    compare the length of the dimension with a distance from the origin of the encapsulated GUI component to at least one boundary of a viewable area of the GUI container window;
    determine that the length of the dimension is larger than the distance from the origin of the encapsulated GUI component to the at least one boundary of the viewable area of the GUI container window;
    determine that the event associated with the encapsulated content control element of the encapsulated GUI component will result in at least a portion of the changed viewable area of the encapsulated GUI component extending outside of the at least one boundary of the viewable area of the GUI container window; and
    adjust both the container content associated with the GUI container window and the encapsulated GUI component automatically, in response to determining that the at least the portion of the changed viewable area of the encapsulated GUI component would extend outside of the at least one boundary of the viewable area of the GUI container window, to display the at least the portion of the changed viewable area of the encapsulated GUI component within the at least one boundary of the viewable area of the GUI container window, where adjustment of the container content is controlled responsive to the detected event associated with the encapsulated content control element of the encapsulated GUI component.

16. A computer program product comprising a non-transitory computer useable storage medium including a computer readable program, where the computer readable program when executed on a computer causes the computer to:
  display a graphical user interface (GUI) container window comprising at least one container content control element that scrolls container content of the GUI container window;
  display, as a portion of the container content of the GUI container window, an encapsulated GUI component comprising an encapsulated content control element;
  detect an event associated with the encapsulated content control element of the encapsulated GUI component that changes a viewable area of the encapsulated GUI component;
  determine that the event associated with the encapsulated content control element of the encapsulated GUI component will result in at least a portion of the changed viewable area of the encapsulated GUI component extending outside of at least one boundary of a viewable area of the GUI container window; and
  adjust both the container content associated with the GUI container window and the encapsulated GUI component automatically, in response to determining that the at least the portion of the changed viewable area of the encapsulated GUI component would extend outside of the at least one boundary of the viewable area of the GUI container window, to display the at least the portion of the changed viewable area of the encapsulated GUI component within the at least one boundary of the viewable area of the GUI container window, where adjustment of the container content is controlled responsive to the detected event associated with the encapsulated content control element of the encapsulated GUI component.

17. The computer program product of claim 16, where, in causing the computer to detect the event associated with the encapsulated content control element of the encapsulated GUI component that changes the viewable area of the encapsulated GUI component, the computer readable program when executed on the computer causes the computer to poll the encapsulated GUI component to identify the event.

18. The computer program product of claim 16, where, in causing the computer to detect the event associated with the encapsulated content control element of the encapsulated GUI component that changes the viewable area of the encapsulated GUI component, the computer readable program when executed on the computer causes the computer to receive the event in response to the event being sent from the encapsulated GUI component.

19. The computer program product of claim 16, where, in causing the computer to determine that the event associated with the encapsulated content control element of the encapsulated GUI component will result in the at least the portion of the changed viewable area of the encapsulated GUI component extending outside of the at least one boundary of the viewable area of the GUI container window, the computer readable program when executed on the computer causes the computer to:
  determine a length of a dimension of the viewable area of the encapsulated GUI component relative to an origin of the encapsulated GUI component;
  compare the length of the dimension with a distance from the origin of the encapsulated GUI component to the at least one boundary of the viewable area of the GUI container window; and
  determine that the length of the dimension is larger than the distance from the origin of the encapsulated GUI component to the at least one boundary of the viewable area of the GUI container window.

20. The computer program product of claim 16, where, in causing the computer to adjust both the container content associated with the GUI container window and the encapsulated GUI component automatically, in response to determining that the at least the portion of the changed viewable area of the encapsulated GUI component would extend outside of the at least one boundary of the viewable area of the GUI container window, the computer readable program when executed on the computer causes the computer to scroll the container content associated with the GUI container window to display the at least the portion of the changed viewable area of the encapsulated GUI component within the at least one boundary of the viewable area of the GUI container window.

21. The computer program product of claim 16, where the computer readable program when executed on the computer further causes the computer to adjust the at least one container content control element of the GUI container window within which the encapsulated GUI component is displayed to represent that the container content associated with the GUI container window has been adjusted in response to the detected event associated with the encapsulated content control element of the encapsulated GUI component.

* * * * *